May 16, 1950
N. L. LUSTER
2,507,987
GAS AND LIQUID MIXING DEVICE AND LEVEL
CONTROL MEANS THEREFOR
Filed June 28, 1945
2 Sheets-Sheet 1
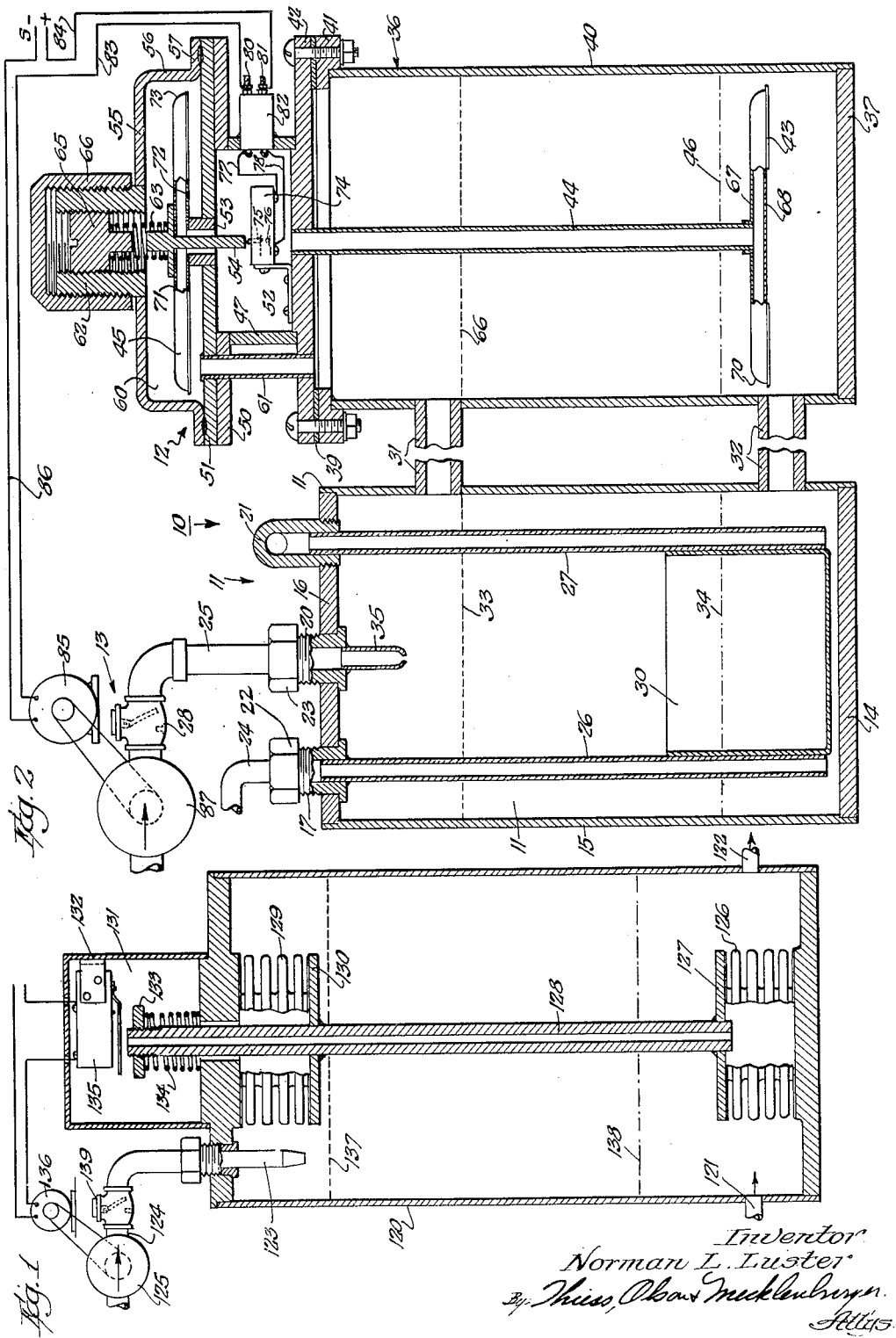
Inventor
Norman L. Luster

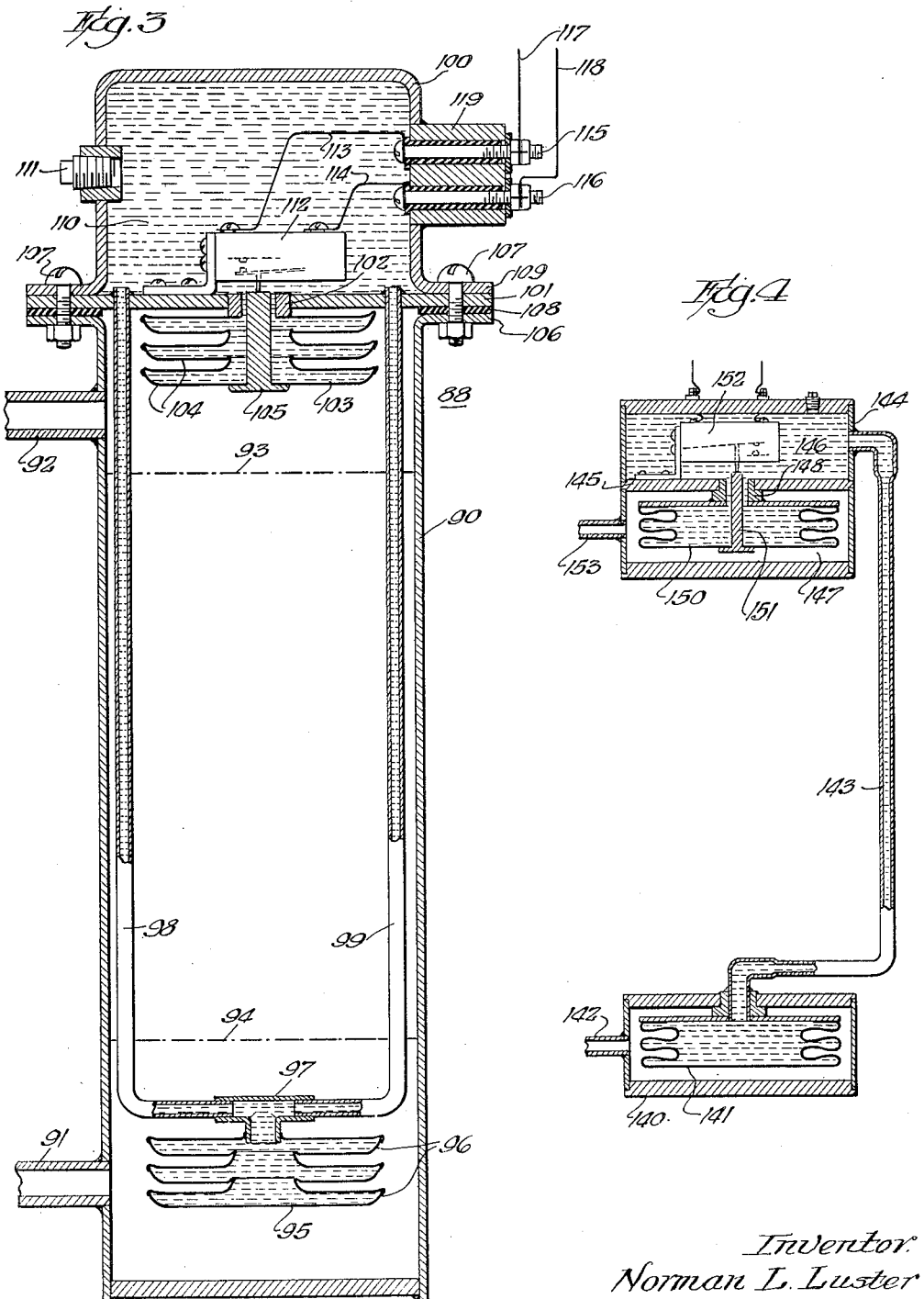

Patented May 16, 1950

2,507,987

UNITED STATES PATENT OFFICE 2,507,987

GAS AND LIQUID MIXING DEVICE AND
LEVEL CONTROL MEANS THEREFOR

Norman L. Luster, Chicago, Ill.

Application June 28, 1945, Serial No. 602,126

13 Claims. (Cl. 261—19)

This application relates to pressure responsive devices and more particularly to pressure responsive devices for controlling the level of liquids in containers, it being an object of the invention to provide an improved pressure responsive device of the character indicated.

It is a further object of the invention to provide an improved pressure responsive device of the character indicated for controlling the liquid level in apparatus containing gas and liquid.

It is a further object of the invention to provide an improved pressure responsive device of the character indicated for controlling the liquid level in apparatus for mixing carbon dioxide gas and water.

It is a further object of the invention to provide an improved apparatus for mixing gases and liquids and to control the liquid level in such apparatus.

It is a further object of the invention to provide an improved pressure responsive liquid level control device for gas and liquid mixing apparatus which may be attached to existing gas and liquid mixing apparatus for controlling the liquid level therein without substantially modifying such apparatus.

Apparatus for holding a supply of liquid which is drawn off from time to time as well as apparatus containing gases and liquids, for example apparatus for mixing carbon dioxide with water to obtain carbonated water which is drawn off at random intervals, requires liquid level control apparatus to prevent the supply of liquid in the apparatus or tank from increasing or decreasing to undesirable values. Such liquid level control devices include apparatus which operates on mechanical principles as well as electrical principles and among the devices operating on mechanical principles are the ones operated by floats.

Float operated level control mechanisms for carbon dioxide gas and water mixing devices or carbonating devices operate at relatively high pressures necessitating heavy tank constructions and generally have an operating shaft extending through the tank wall to control the liquid flow. The high pressures require heavy and expensive packing around the operating shaft giving rise to considerable frictional force, thus making imperative the use of a large float to exert the required effort. This results in a bulky construction which is undesirable because the large size serves no other useful purpose, and where the complete apparatus is immersed in a cooling medium, the bulky construction becomes particularly undesirable.

It is an object of the invention to provide an improved level control device which is small, is easy to make, has long life, is simple in construction and has a high factor of certainty of operation.

According to one form of the invention, a liquid level control is provided for a gas and liquid mixing device having a container to which gas and liquid are adapted to be supplied for mixing which comprises a pressure responsive device and electric switch means operated by the pressure responsive device for controlling the operation of means for supplying liquid to the container. The pressure responsive device includes a pair of liquid filled pressure responsive vessels having a liquid filled interconnecting conduit whereby the response of one of the vessels is opposed by the response of the other vessel. A chamber is associated with the pressure responsive means and is connected by conduits to the gas and liquid container so that one of the pressure responsive vessels is subjected to the pressure of the gas in the container and the other of the pressure responsive vessels is subjected to the combined pressures of the gas and the liquid in the container. The pressure responsive vessels expand or contract with changing liquid level in the container and the electric switch is arranged adjacent one of the vessels so as to be operated by the vessel when it expands or contracts. More particularly, the pressure responsive devices comprise either single flange or multiple flange bellows which are expansible and compressible.

While the invention in this application is illustrated and described in connection with apparatus for mixing carbon dioxide gas and water, it will be understood by those skilled in this art that changes may be made to adapt the invention for use in any apparatus where it is desired to exert a control function making use of fluid pressure differences.

For a more complete understanding of the invention, reference should now be had to the accompanying drawings, in which:

Figure 1 is a vertical sectional view of gas and liquid apparatus having a liquid level control device embodying the invention;

Fig. 2 is a vertical sectional view of gas and liquid apparatus having a liquid level control device embodying an improved form of the invention arranged in a separate container;

Fig. 3 is a vertical sectional view of another form of liquid level control device embodying the invention, and Fig. 4 is a vertical sectional view of still another form of liquid level control device embodying the invention.

Referring to the drawings in greater detail, and referring particularly to Fig. 2, which illustrates the preferred form of the invention, a device is shown for mixing carbon dioxide gas and water commonly referred to as carbonators and indicated generally by the reference numeral 10.

The carbonator 10 comprises a supply tank or container 11, a level control device 12, and a motor and pump arrangement 13 which is controlled by the level control device 12 for supplying water to the supply tank 11. The supply tank 11 not only forms a reservoir for the mixture of carbon dioxide gas and water, but it also forms the actual mixing chamber in which the carbon dioxide gas is mixed with the water. The container 11 comprises a cylindrical tank having a base 14, a cylindrical body 15, and a top 16, which are attached to each other by any well known means which, for example, may be welding. The base 14, the top 16, and the side wall 15 are formed of metal having sufficient thickness to withstand pressures which may exceed 125 lbs. per square inch with suitable safety factors. The top 16 is provided with a carbon dioxide inlet connection 17, a water inlet connection 20, and an outlet connection 21 for the carbonated water, the connections 17, 20 and 21 being received in suitably provided openings in the top 16 and welded or brazed thereto to form fluid tight connections. The connections 17 and 20 are threaded, as shown, to receive the flange nuts 22 and 23 for attaching the inlet pipes 24 and 25 to the supply tank and a fluid check valve 28 is placed in the inlet pipe 25 to prevent the reverse flow of mixture from tank 11. The outlet connection 21 is an ordinary pipe elbow to which an outlet pipe is connected.

Extending inwardly from the carbon dioxide gas connection 17 is a conduit 26 which extends substantially to the bottom of the tank, whereby the gas which leaves the bottom of the conduit 26 will bubble through the water contained in the tank and will tend to be absorbed thereby. Extending downwardly from the outlet connection 21 is a pipe or conduit 27 which is similar to the conduit 26, the conduits 26 and 27 being attached at their lower ends by welding or similar means to a cup 30 for holding the pipes rigidly together. The pipes 26 and 27 are attached to the inlet members 17 and 21 also by welding or brazing, for example. At one side of the cylindrical wall 15 are two openings into which are received the hollow connections or conduits 31 and 32. The conduits 31 and 32 are placed as close to the top and bottom of the tank as conveniently possible, the conduit 31 being placed above the highest level of gas and water desired in the tank indicated by the broken line 33, and the conduit 32 being placed below the lowest level of liquid desired in the tank indicated by the broken line 34. Extending into the tank from the inlet member 20 is the pipe jet 35, the purpose of which will become clear subsequently in this specification.

When carbon dioxide gas enters the tank 15 through the conduit 26 and bubbles up through the water in the tank, some of the gas is absorbed but a large portion of it collects in the space above the surface of the water. In order to thoroughly intermix the gas with the water, water is forced into the tank through the jet 35 under considerable pressure whereby the water jet exerts substantial force. The water coming in through the jet under high pressure causes the stream of water to break into the water already in the tank and extend down through it to a considerable depth. In doing so, the carbon dioxide gas is carried with the jet down into the body of the water with sufficient turbulence so that the gas is not only carried down into the water, but it is carried outwardly away from the path of the jet. The turbulent condition in the tank caused by the jet results in thoroughly agitating the water and since the gas is carried into the water it is spread throughout the body of the water with great effectiveness, and consequently, the water absorbs substantially all of the gas it can hold.

The level regulator 12 is attached to the supply tank 11 by means of the conduits 31 and 32 and comprises a tank 36 of the same general dimensions as the supply tank 11 including a bottom 37, a cylindrical wall 40, and a circular flange 41 at the top of the cylindrical wall 40 to which the cover plate 42 is attached. The cover plate 42 is separated from the flange 41 by a gasket 39. The circular flange 41, the cylindrical body 40, and the bottom 37 are attached to each other by means of welding or other well known means.

The cover plate 42 carries and supports the level regulating mechanism, which includes a bellows flange 43, a conduit 44 attached thereto, and a bellows flange 45, the inside of which is operatively related with the conduit 44 as will be made clear. The conduit 44 is received in an opening substantially in the center of the cover plate 42 and is attached thereto by means such as by welding. Furthermore, the conduit 44 is of sufficient length, so that, when the cover plate 42 is assembled to the circular flange 41, the bellows 43 is placed in the tank 36 below the lower level of the liquid indicated by the broken line 46. The broken line 46 is at the same level as the broken line 34, since the tanks 11 and 36 are in communication with each other. Extending upwardly from the cover plate 42 and welded or brazed thereto is a wall 47 at the upper end of which is a flange 50, which is, in turn, welded or brazed to a cover plate 51 to form the chamber 52. Substantially at the center of the plate 51 there is a hollow nipple 53 welded or brazed thereto to form a passageway extending to the chamber 52. One side of bellows 45 is attached to nipple 53, as shown, thereby placing the inside of the bellows 45 in communication with the inside of the bellows 43, through the nipple 53, the chamber 52 and the conduit 44. Rigid with the opposite side of bellows 45 from the nipple 53 is the switch operating stem 54 which extends through nipple 53 and into chamber 52.

A member 55 forms a chamber 60 with the plate 51 to house bellows 45. Member 55 may be in the form of a cylindrical wall 56, if so desired, which terminates at its lower end in a flange 57, this flange 57 being suitably attached to plate 51, as by welding, brazing, or other suitable connection. To connect the chamber 60 with the inside of the tank 36, a conduit 61 passes through the plate 51, the annular member 50, and the cover plate 42 by means of aligned openings whereby the outside of the bellows 45 is subjected to whatever gas pressure exists inside of the container 36.

Centrally of chamber housing 55 there is an upwardly extending sleeve 62 welded or brazed thereto, the sleeve 62 being internally as well as externally threaded. Bearing against the upper surface of the switch operating member 54 is a coil spring 63 which extends into the inner surface of the sleeve 62 and is engaged by an adjusting nut 65 which is threaded to the inside of the sleeve 62. In order to insure that the chamber 60 is completely sealed to the atmosphere, the cover plate 66 is threaded to the outside of the sleeve 62.

Bellows 43 comprises a pair of relatively thin flexible disks 67 and 68 which are suitably joined to each other at their outer edges or peripheries. The member 67 includes an opening at its center, which is provided with a suitable flange to which the conduit 44 is attached as shown. Since the members 67 and 68 are flexible, the bellows 43 is readily responsive to pressure changes, the walls of bellows contracting when the external pressure increases and expanding when the external pressure decreases. Bellows 45 is substantially similar to bellows 43 and includes the relatively thin flexible circular disks 71 and 72, which are suitably joined to each other at their outer edges or peripheries. Furthermore, the member 71 has an opening at its center through which switch operating plunger 54 extends, and the member 72 has an opening at its center communicating with the nipple 53 and through which the plunger 54 extends to operate the switch 74 in chamber 52. Bellows 45 also expands and contracts with corresponding changes in the external pressure.

The bellows 43 and 45 along with the conduit 44 and the chamber 52 are completely filled with a fluid, which, for example, may be a light oil and form a completely closed pressure responsive system since liquids are to all intents and purposes incompressible. When bellows 43 is compressed by the application of pressure, it will decrease in volume and fluid will be forced through the conduit 44 and the chamber 52 into bellows 45 to expand it. Correspondingly, if pressure is applied to bellows 45, it is compressed and the fluid flows in the reverse direction into bellows 43 to expand this member.

With the various elements of the arrangement assembled, as shown, and assuming that the tank 11 is filled with carbonated water up to the broken line 33, it will be apparent that the level of carbonated water in tank 36 indicated by the broken line 66 is the same as in the tank 11. Since carbon dioxide is being supplied to tank 11 at all times, there is an atmosphere of carbon dioxide always existing above the surface of the water in both tanks 11 and 36. The carbon dioxide gas also flows through conduit 61 and into chamber 60 to completely surround bellows 45. Consequently, bellows 45 is always subject to the pressure of the carbon dioxide gas, whereas bellows 43 is subject to the pressure of the carbon dioxide gas plus the head of the liquid in the tank 36. Therefore, bellows 43 is always subject to a pressure greater than the pressure on bellows 45 by an amount equal to the pressure exerted by the carbonated water in the tank 36.

The fluid inside of bellows 43, conduit 44, and bellows 45 acts as a pressure transmitting medium transmitting the increased pressure on the bellows flange 43 to bellows 45, and forcing the switch operating bellows flange 45 to expand. Since bellows 45 is flexible and resilient, it tends to resist the expansion caused by the forcing of the bellows fluid into it, and therefore, tends to return to its normal or unexpanded position when the pressure on bellows 43 is removed. It is apparent that bellows 45 is subjected to the difference in the pressures exerted on it by the carbon dioxide gas and the pressure exerted on bellows 43. Since the difference in these pressures is that exerted by the height of the fluid in tank 36, it is a small pressure and thus the members 71 and 72 of bellows 45 as well as the members 67 and 68 of bellows 43 should preferably be sufficiently resilient to respond to this small pressure difference. Hence, bellows 43 and 45 are preferably quite flexible and are sensitive to small changes in pressures. The pressure responsive device is a balanced pressure device since the pressure of the carbon dioxide gas is balanced against the pressure exerted by the combination of carbon dioxide gas and the height of the carbonated water by the fluid inside of the bellows flanges.

Assuming that the normal position of the system as shown in Fig. 2 is when the carbonated water is at the level of the broken line 66, bellows 43 is subjected to a pressure which is the sum of the carbon dioxide pressure plus the head of the carbonated water and is therefore compressed. The fluid in bellows 43 has, therefore, been forced into bellows 45 which is expanded, and therefore the switch operating member or plunger 45 is in its raised position and out of contact with switch 74. When the carbonated water level in tank 36 drops to the level of broken line 46, the pressure on bellows 43 has decreased by the change in the liquid head. Therefore, bellows 45 will have a decreased internal pressure, and accordingly, it will contract and force fluid into bellows 43, thus causing plunger 54 to come into contact with switch 74 and operating it to control the motor and pump system 13 to restore the carbonated water level to the level of broken line 66.

To operate the motor and pump system 13, switch 74 is arranged inside of the chamber 52. Switch 74 is of a well known type having two contacts 75 and 76 of which contact 75 is arranged to be operated by switch plunger 54. Contacts 75 and 76 are arranged at the ends of flexible arms which normally maintain the switch contacts in the open position. Connecting the switch contacts 75 and 76 and the bolts 80 and 81 are the conductors 77 and 78, the bolts being received and sealed in a housing 82 which is welded or brazed to the wall 47 to form a fluid tight connection. Extending from bolts 80 and 81 are conductors 83 and 84 of which the conductor 83 connects with a motor 85 and the conductor 84 extends to an electrical source of supply S. To complete the circuit of the motor 85, a conductor 86 connects the source of supply S to motor 85. Motor 85 is connected by means of a pulley and belt to the pump 87. With the circuit as described, it will be clear that whenever switch plunger 54 closes the contacts 75 and 76, which occurs when the liquid level is at the broken line 46, motor 85 will begin to run, thereby driving the pump 87 to pump water through the jet 35 and fill the container 11. When the level in the tank reaches the level of broken line 66, switch plunger 54 moves upwardly allowing contacts 75 and 76 to open thereby interrupting the electrical circuit to motor 85, which, accordingly, stops and the system is in condition for a repeated operation. Placing the switch 74 inside of chamber 52 immerses the contacts thereof in the liquid which fills bellows 43 and 45, thereby forming good electrical insulation, preventing rusting and suppressing arcs which may form.

In the event that it is desired to vary the height of the carbonated water in the tank 11, adjusting nut 65 is turned by means of a screw driver or the like to place the spring 63 under a greater or lesser compression and thereby exert a greater or a lesser force on member 71 of bellows 45. If spring 63 is placed under increased compression, a greater amount of liquid can be accommodated in the tank 11, since it will take a greater pressure on bellows 43 to force bellows 45 to expand and thereby move plunger 54. If adjusting nut 65 is turned so as to relieve the compression of spring 63, it will require a lesser amount of carbonated water in tank 36 in order to cause bellows 43 to exert sufficient force to make bellows 45 expand, and consequently, to move plunger 54.

Since bellows 43 and 45 are of a sealed construction and conduit 44 connecting them as well as the members forming chamber 52 are sealed, the fluid therein cannot leak out and thus the system operating condition remains relatively constant. Chamber 60 has carbon dioxide in it and some of the carbon dioxide gas may conceivably leak out through connections of hollow sleeve 62, adjusting nut 65 and cap 66. This is not of serious moment since the carbon dioxide is being continuously supplied to the system through the inlet 24 so that the gas pressure is maintained at all times.

Referring to Fig. 3, there is shown a control device 88 which is a modification of the control device 12 illustrated in Fig. 2. Device 88 comprises a tank 90 which has fluid conduits 91 and 92 corresponding to conduits 31 and 32 of Fig. 2 connected thereto. Conduit 92 is above the highest level of the carbonated water desired, which is indicated by the broken line 93, and conduit 91 is below the lowest level of the carbonated water desired which is indicated by the broken line 94. Arranged within tank 90 below the broken line 94 is a bellows 95 which may consist of a series of bellows flanges 96. Each of the bellows flanges 96 is made of a pair of thin resilient members, which are attached to each other by means of welding, brazing or soldering. One end of the bellows is attached to a T connection 97 from which extend two conduits 98 and 99, the two conduits 98 and 99 passing through suitable openings in the cover plate 101 and being welded or brazed thereto, as shown. At the center of the cover plate 101, there is an opening into which is received the connecting nipple 102, to which is attached another bellows 103 also comprising a series of bellows flanges 104 connected to each other to form a closed unit. The bellows 103 includes a plunger 105 which is arranged to project through the center of the bellows and through nipple 102 in order to contact a switch for controlling a motor driven pump system similar to that illustrated in Fig. 2.

Arranged over cover plate 101 is a cup-shaped member 100 which is attached to cover plate 101 by welding or brazing to form a sealed chamber 110 and to a flange 106 at the top of tank 90 by means of bolts 107, a gasket 108 being arranged between cover plate 101 and flange 106 in order to seal tank 90. A plug 111 for filling chamber 110, conduits 98 and 99 and bellows 95 and 103 with a suitable pressure transmitting fluid is threaded in a boss in the wall of cup 100. Arranged inside of chamber 110 is a switch 112 from which extend conductors 113 and 114. The conductors 113 and 114 are connected to bolts 115 and 116, from which extend conductors 117 and 118, respectively, for controlling the operation of the motor driven pump system (not shown). Bolts 115 and 116 are suitably sealed into a housing 119, which may be of metal and welded or brazed to cup 100.

The bellows 95, the bellows 103, the conduits 98 and 99, and the chamber 110 are completely filled with a pressure transmitting fluid so that compression of bellows 95 causes fluid to flow through conduits 98 and 99 into chamber 110 and into bellows 103, causing it to expand and thereby move plunger 105 out of contact with switch 112. The reverse situation also occurs. That is, when pressure on bellows 95 is relieved, such as by a decrease in the fluid level in tank 90 to the broken line 94, the resiliency of bellows 103 causes it to contract forcing fluid out of it through conduits 98 and 99 into bellows 95, and consequently, moving plunger 105 into contact with switch 112 to start the motor and pump system. Connecting a number of bellows flanges in series as shown to form a larger completed bellows results in a fluid responsive device which gives a greater movement before producing operation of the switch 112.

The operation of the construction shown in Fig. 3 is substantially similar to that described for Fig. 2. Bellows 103 is arranged above the highest liquid level indicated by the broken line 93, and therefore, it is subject to only the carbon dioxide pressure which is transmitted through the conduit 92. Bellows 95 is subjected to the combined pressures of the carbon dioxide above the broken line 93 and the head of the carbonated water which varies between the levels indicated by broken lines 93 and 94. Accordingly, when the liquid level is at the level of broken line 93, pressure will be greater on bellows 95 and bellows fluid will have been forced into bellows 103, causing it to expand to open switch 112, and, when the liquid level has dropped to that indicated by broken line 94, the pressure on the bellows 95 will still be that of the carbon dioxide gas, plus that exerted by the decreased amount of carbonated water. The pressure on bellows 95 is, therefore, decreased and due to the resilience of bellows 103 causing it to contract, the fluid moves from bellows 103 into bellows 95, the contraction of bellows 103 acting to close switch 112.

Similarly to the arrangement of Fig. 2, the pressure responsive system illustrated in Fig. 3 is a balanced pressure system in that the pressure of the gas acting on bellows 103 is balanced against the pressure exerted on bellows 95 by the gas and liquid combined. Accordingly, bellows 95 and 103 should preferably be sufficiently resilient to respond to the pressure difference which is due to the liquid. These bellows may, therefore, be of a light, flexible and very sensitive construction.

Referring more particularly to Fig. 1, an arrangement is illustrated in which the fluid pressure level control device is embodied within the container for holding the carbonated water. The arrangement illustrated includes a tank 120 which has a gas inlet 121, a carbonated water outlet 122, both at the lower end of the tank, and a water inlet at the upper part of the tank, the water inlet comprising a jet 123 which is connected with a conduit 124 into which a pump 125 is adapted to pump water. A fluid check valve 136 is placed in conduit 124 to prevent reverse flow of liquid, gas, or both from container 120. Arranged inside of tank 120 at the bottom thereof is a bellows 126, one end of which is attached to the bottom of tank 120 by welding, brazing, or soldering, for example, and the other end of which is similarly attached to a plate 127. Also arranged inside of the tank at the top thereof is a bellows 129 which is attached to the top of the tank at one end by welding, brazing or soldering and at its other end there is a plate 130. Suitably connecting the plates 127 and 130 is a conduit 128 extending through an opening in the cover of tank 120 and into a chamber 131 formed by the cup-like member 132 at the top of tank 120.

The top end of conduit 128 is threaded as shown and has a nut 133 threaded to it for adjusting the tension in the spring 134 in order to vary the height of the carbonated water within tank 120 in a manner similar to that described for Fig. 2. Also arranged within chamber 131 is a switch 135 for controlling the operation of a motor 136 in a manner similar to that described for Fig. 2. Since the carbon dioxide gas enters through conduit 121, the gas will bubble through the water and form an atmosphere of carbon dioxide gas above the broken line 137, which indicates the highest level of carbonated water. Bellows 129 is, therefore, subjected to only the pressure of the carbonated dioxide gas, whereas the bellows 126 is subjected to the pressure of the carbon dioxide gas as well as to the head caused by the carbonated water. Bellows 126 and 129, the conduit 128 and the chamber 131 are filled with bellows fluid for transmitting pressure changes from one bellows to the other. The pressures on bellows 126 and 129 are balanced against each other through the bellows fluid, and hence each bellows need withstand only the difference of the pressures.

Whenever the level of the water reaches the broken line 137, the increased pressure on bellows 126 causes it to contract and force fluid into bellows 129. Accordingly, conduit 128 moves downwardly against the force of spring 134, and therefore, moves out of contact with switch 135. When the liquid level drops to that indicated by broken line 138, the pressure is relieved in bellows 126, which, accordingly, expands allowing fluid to move from bellows 129 into bellows 126 whereupon conduit 128 moves upwardly and closes switch 135. By adjusting the position of the nut 133, the liquid level indicated by the position of broken line 137 can be varied as has already been described for the construction illustrated in Fig. 2.

Referring to Fig. 4, there is shown a further modification in which two bellows of a pressure responsive system are arranged in separate containers. The arrangement illustrated in Fig. 4 is more particularly suitable for use as a level indicating device in applications where it is not convenient to house the complete system in one container. A container 140 is adapted to include a bellows 141, which comprises a series of bellows flanges. A conduit 142 communicates with container 140 to conduct the fluid, the level of which it is desired to control, to chamber 140 so that the pressure of this fluid will be exerted on the outside of bellows 141. Extending out of chamber 140 and connected to bellows 141, is a conduit 143, which is connected to a container 144. Container 144 is completely enclosed and is divided into two portions by a separating plate 145, this separating plate forming two chambers 146 and 147. Welded or brazed to the separating plate 145 is a connecting member 148 to which the bellows 150 is attached by similar means. Consequently, the inside of bellows 150, chamber 146, conduit 143, and the inside of bellows 141 are in communication with each other and are filled with a pressure transmitting fluid. As the fluid is forced to move from bellows 141 to bellows 150, they compress and expand, respectively, and conversely. Expansion of bellows 150 due to an increase of pressure on bellows 141 effects movement of plunger 151 to open a switch 152 arranged in chamber 146, and contraction of bellows 150 due to a decrease of pressure on bellows 141 causes plunger 151 to close switch 152, the switch 152 being arranged to control the level wherever desired. Chamber 147, which contains bellows 150, has a conduit 153 communicating with it for conducting fluid pressure to chamber 147 for controlling the point at which bellows operate. Conduits 142 and 153 are connected to the two points of a container between which the fluid level is to be controlled. In this construction also the external pressures on bellows 150 and 141 are balanced against each other through the fluid connection and each bellows need only withstand the differences in these pressures.

A spring may be associated with plunger 151 for adjusting the level desired substantially in the same manner as in Figs. 1 and 2.

While the invention has been specifically described as using a liquid in the bellows and their connecting conduit, the invention is not limited thereto but also contemplates the use of other fluids such as gases and vapors.

Without further elaboration, the foregoing will so fully explain the gist of my invention that others may, by applying current knowledge, readily adapt the same for use under varying conditions of service without eliminating certain features, which may properly be said to constitute the essential items of novelty involved, which items are intended to be defined and secured to me by the following claims.

I claim:

1. A mixture level control device for a gas and liquid mixing unit having a container to which gas and liquid are to be supplied for mixing comprising, a pair of liquid filled expansible and compressible bellows interconnected by a liquid filled conduit to form a closed fluid system, means for subjecting one of said bellows to the pressure of the gas in said container and the other of said bellows to the combined pressures of the liquid and gas in said container, and an actuator operable by one of said pair of bellows upon a predetermined differential in the pressure of the gas in said container and the combined pressures of the liquid and gas in said container, said actuator controlling the supply of liquid to said container.

2. A mixture level control device for a gas and liquid mixing unit having a container to which gas and liquid are to be supplied for mixing comprising, a pair of liquid filled single flange bellows interconnected by a liquid filled conduit to form a closed fluid system, means for subjecting one of said bellows to the pressure of the gas in said container and the other of said bellows to the combined pressures of the liquid and gas in said container, and an actuator operable by one of said pair of bellows upon a predetermined differential in the pressure of the gas in said container and the combined pressures of the liquid and gas in said container, said actuator controlling the supply of liquid to said container.

3. A liquid level control device for a gas and liquid mixing unit having a container to which gas and liquid are to be supplied for mixing comprising, a pair of single flange liquid filled bellows interconnected by a liquid filled conduit to form a closed fluid system, said liquid being electrically insulating, means for subjecting one of said bellows to the pressure of the gas in said container and the other of said bellows to the combined pressure of the liquid and gas in said container, electric contact means in said fluid system, an actuator connected to one of said bellows for operating said contact means upon a predetermined differential in the pressure of the gas in said container and the combined pressure of the liquid and gas in said container, operation of said control means controlling the supply of liquid to said container, and means associated with one of said bellows for varying the mixture level in said container at which said contact means is operated.

4. A liquid level control device for a gas and liquid mixing unit having a container to which gas and liquid are to be supplied for mixing comprising, a pair of single flange liquid filled bellows interconnected by a liquid filled conduit to form a closed fluid system, said liquid being electrically insulating, means for subjecting one of said bellows to the pressure of the gas in said container and the other of said bellows to the combined pressure of the liquid and gas in said container, electric contact means in said fluid system, an actuator connected to one of said pair of bellows for operating said contact means upon a predetermined differential in the pressure of the gas in said container and the combined pressure of the liquid and gas in said container, operation of said control means controlling the supply of liquid to said container, and means including a resilient element associated with one of said pair of bellows for varying the mixture level in said container at which said actuator operates said contacts.

5. A liquid level control device for a gas and liquid mixing unit having a container to which gas and liquid are to be supplied comprising, vessel means, a pair of liquid filled bellows interconnected by a liquid filled conduit to form a closed fluid system in said vessel means, conduit means leading from said vessel means, conduit means for connection to said container whereby one of said bellows is adapted to be subjected to the pressure of the gas in said container and the other is adapted to be subjected to the combined pressure of the liquid and gas in said container, an actuator operable by one of said pair of bellows upon a predetermined differential of the gas in said container and the combined pressure of the liquid and gas in said container, said actuator controlling the supply of liquid to said container, and means including a resilient element associated with one of said pair of bellows for varying the mixture level in said container at which said actuator is operated.

6. A liquid level control device for a gas and liquid mixing unit having a container to which gas and liquid are to be supplied for mixing comprising, a pair of liquid filled bellows interconnected by a liquid filled conduit to form a closed fluid system, said liquid being electrically insulating, a vessel surrounding one of said pair of bellows including conduit means for connection to said mixing unit for subjecting said one of said pair of bellows to the pressure of the gas in said container, a vessel surrounding the other of said pair of bellows including conduit means for connection to said mixing unit for subjecting said other of said pair of bellows to the combined pressure of the liquid and gas in said container, electric contact means in said fluid system, an actuator connected to one of said pair of bellows for controlling said contact means upon a predetermined differential in the pressure of the gas in said container and the combined pressure of the liquid and gas in said container, operation of said contact means controlling the supply of liquid to said container, and means including a resilient element associated with one of said pair of bellows for varying the mixture level in said container at which said actuator is operated.

7. A liquid level control device for a gas and liquid mixing unit having a container to which gas and liquid are to be supplied for mixing comprising, a closed system including a pair of liquid filled bellows and a liquid filled conduit interconnecting said bellows, said liquid being electrically insulating, means for subjecting one of said pair of bellows to the pressure of the gas in said container and the other of said pair of bellows to the combined pressure of the gas and liquid in said container, electric contact means in said closed fluid system, an actuator connected to one of said pair of bellows for varying said contact means upon a predetermined differential in the pressure of the gas in said container and the combined pressure of the gas and liquid in said container, said contacts controlling the operation of said contact means controlling the supply of liquid to said container, and means including a resilient element associated with one of said pair of bellows for varying the mixture level in said container at which said contact means is operated.

8. A control device comprising, vessel means for receiving liquid between a top and a bottom level, means communicating between the inside and outside of said vessel means at a point below said bottom level, a pair of liquid filled bellows interconnected by a liquid filled conduit to form a closed system, one of said bellows being disposed in said vessel means adjacent said bottom level, the other of said bellows being disposed where it is not subjected to the liquid in said vessel means, and an actuator connected to one of said pair of bellows.

9. A liquid level control device comprising, closed vessel means for receiving liquid between top and bottom levels, first means communicating between the inside and outside of said vessel means disposed adjacent said bottom level for liquid flow relative thereto, second means communicating between the inside and outside of said vessel means disposed adjacent said top level for subjecting the inside of said vessel means to gas pressure, a pair of liquid filled bellows interconnected with a liquid filled conduit forming a closed system disposed in said vessel means, one of said pair of bellows being disposed below said bottom level and the other of said bellows being disposed where it is not subject to said liquid, and actuator means connected to one of said pair of bellows.

10. A liquid level control device comprising, closed vessel means for receiving liquid between top and bottom levels, first means disposed below said bottom level for liquid flow relative to said vessel means, second means disposed above said top level for subjecting the inside of said vessel means to gas pressure, a pair of bellows interconnected by a passageway forming a closed system, said system being filled with an electrically insulating liquid, one of said pair of bellows being disposed in said vessel means below said bottom level and the other of said pair of bellows being disposed in said vessel means above said top level, electric contact means disposed in said liquid in said passageway, and actuator means connected to one of said bellows for controlling operation of said contact means.

11. A level control device for a gas and liquid mixing device comprising, closed vessel means for containing gas and liquid mixture between top and bottom levels, first means disposed below said bottom level for conducting gas and liquid mixture into and out of said vessel means, second means disposed above said top level for subjecting the inside of said vessel means to the pressure of said gas, a pair of bellows interconnected by a passageway forming a closed system, said system being filled with an electrically insulating liquid, one of said pair of bellows being disposed in said vessel means below said bottom level and the other of said pair of bellows being disposed in said vessel means where it is subject only to the pressure of said gas, electric contact means disposed in said liquid in said passageway, and actuator means connected to one of said pair of bellows for controlling operation of said contact means.

12. A level control device for a gas and liquid mixing device comprising, closed vessel means for containing gas and liquid mixture between top and bottom levels, first means disposed below said bottom level for conducting gas and liquid mixture into and out of said vessel means, second means disposed above said top level for subjecting the inside of said vessel means to the pressure of said gas, a pair of single flange bellows interconnected by a passageway forming a closed system, said system being filled with electrically insulating liquid, one of said pair of bellows being disposed in said vessel means below said bottom level whereby it is subjected to the pressure of said gas and liquid mixture and the pressure of said gas in said vessel means, the other one of said pair of bellows being disposed in said vessel means where it is subjected only to the pressure of said gas, electric contact means disposed in said liquid in said passageway, and actuator means connected to said other one of said pair of bellows for controling operation of said contact means.

13. A level control device for a gas and liquid mixing device comprising, closed vessel means for containing gas and liquid mixture between top and bottom levels, first means disposed below said bottom level for conducting gas and liquid mixture into and out of said vessel means, second means disposed above said top level for subjecting the inside of said vessel means to the pressure of said gas, a pair of single flange bellows interconnected by a passageway forming a closed system, said system being filled with electrically insulating liquid, one of said pair of bellows being disposed in said vessel means below said bottom level whereby it is subjected to the pressure of said gas and liquid mixture and the pressure of said gas in said vessel means, the other one of said pair of bellows being disposed in said vessel means above said top level where it is subjected only to the pressure of said gas, electric contact means disposed in said liquid in said passageway, and actuator means connected to said other one of said pair of bellows for controlling operation of said contact means.

NORMAN L. LUSTER.

REFERENCES CITED

The following references are of record in the file of this patent:

UNITED STATES PATENTS

| Number | Name | Date |
| --- | --- | --- |
| 978,103 | Bastian | Dec. 6, 1910 |
| 2,072,311 | Nutsford | Mar. 2, 1937 |
| 2,235,357 | Conklin | Mar. 18, 1941 |